US010631566B2

(12) United States Patent
Schlebusch

(10) Patent No.: US 10,631,566 B2
(45) Date of Patent: Apr. 28, 2020

(54) METHOD AND APPARATUS FOR PRODUCING A FOAMED MEAT OR FISH PRODUCT

(75) Inventor: Johannes Schlebusch, Thedingshausen (DE)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 13/704,504

(22) PCT Filed: Jun. 15, 2011

(86) PCT No.: PCT/EP2011/002949
§ 371 (c)(1),
(2), (4) Date: Mar. 6, 2013

(87) PCT Pub. No.: WO2011/157414
PCT Pub. Date: Dec. 22, 2011

(65) Prior Publication Data
US 2013/0216689 A1    Aug. 22, 2013

(30) Foreign Application Priority Data

Jun. 16, 2010 (DE) .......................... 10 2010 023 963

(51) Int. Cl.
*A23C 17/00* (2006.01)
*A23P 30/40* (2016.01)
(Continued)

(52) U.S. Cl.
CPC .............. *A23P 30/40* (2016.08); *A23K 10/20* (2016.05); *A23K 10/22* (2016.05); *A23K 10/26* (2016.05);
(Continued)

(58) Field of Classification Search
CPC ........... A23B 7/144; A23B 4/052; A23B 7/10; A23B 4/021; A23L 3/04; A23L 3/0155;
(Continued)

(56) References Cited

U.S. PATENT DOCUMENTS 2,374,425 A * 4/1945 De Weerth ............ A23L 1/0121
159/25.1
2,748,724 A * 6/1956 Lehner ...................... A23G 9/16
137/602
(Continued)

FOREIGN PATENT DOCUMENTS

CN          103229944     8/2013
DE            3446829     9/1988
(Continued)

OTHER PUBLICATIONS

Strange, et al., "Effects of added connective tissues on the sensory and mechanical properties of restructured beef steaks," Meat Science, 27, pp. 61-74 (1990).

*Primary Examiner* — Jimmy Chou
(74) *Attorney, Agent, or Firm* — Mars, Incorporated

(57) ABSTRACT

The invention relates to a method of producing a foamed meat product, comprising the steps of: feeding a pumpable raw material containing comminuted meat or fish and strand-like connective tissue components to a dispersing apparatus with a chamber with a cylindrical rotor arranged therein, which is provided, on its circumference, with a number of cavities to create cavitation, feeding a gas to the dispersing apparatus and operating the dispersing apparatus while creating cavitation and dispersing the gas supplied, in the process of which the sinews or ligaments are passed through the chamber, and creating a foamed meat or fish product containing strand-like connective tissue components, which can be sterilised.

3 Claims, 7 Drawing Sheets

(51) Int. Cl.
  *A23L 13/20* (2016.01)
  *A23L 13/40* (2016.01)
  *A23L 13/50* (2016.01)
  *A23L 13/60* (2016.01)
  *A23L 17/00* (2016.01)
  *A23N 17/00* (2006.01)
  *A23K 40/00* (2016.01)
  *A23K 10/20* (2016.01)
  *A23K 10/22* (2016.01)
  *A23K 10/26* (2016.01)

(52) U.S. Cl.
  CPC ............. *A23K 40/00* (2016.05); *A23L 13/20* (2016.08); *A23L 13/424* (2016.08); *A23L 13/426* (2016.08); *A23L 13/428* (2016.08); *A23L 13/52* (2016.08); *A23L 13/67* (2016.08); *A23L 17/70* (2016.08); *A23N 17/002* (2013.01); *A23V 2002/00* (2013.01)

(58) Field of Classification Search
  CPC .. A21D 2/02; A47J 27/04; A23N 7/005; B01J 19/18
  USPC ............... 99/467, 470–479, 323.1, 535, 534; 422/127, 225, 209; 536/102; 426/643, 426/474, 646
  See application file for complete search history.

(56) References Cited

U.S. PATENT DOCUMENTS

| | | | |
|---|---|---|---|
| 3,031,313 A | 4/1962 | Morgan et al. | |
| 3,203,111 A * | 8/1965 | Lorant et al. | 34/85 |
| 3,464,342 A * | 9/1969 | Kleinkauf | A23J 1/10 19/4 |
| 3,493,391 A | 2/1970 | Pottie | |
| 3,580,315 A * | 5/1971 | Schnell | 241/86 |
| 3,615,583 A | 10/1971 | Bard et al. | |
| 3,623,998 A * | 11/1971 | Bourne | 521/74 |
| 3,719,454 A * | 3/1973 | Shang | H01S 3/095 123/536 |
| 3,743,523 A * | 7/1973 | Bodine | A23L 3/30 366/108 |
| 3,797,376 A * | 3/1974 | Meyer et al. | 99/353 |
| 3,854,700 A * | 12/1974 | MacManus | 366/176.1 |
| 3,857,986 A | 12/1974 | Svendsen | |
| 3,882,257 A | 5/1975 | Cagle | |
| 3,897,723 A * | 8/1975 | Lucy et al. | 99/467 |
| 3,928,640 A | 12/1975 | Stahler | |
| 3,934,076 A * | 1/1976 | Smith | H02G 15/06 174/87 |
| 3,976,799 A | 8/1976 | Kelly et al. | |
| 4,031,267 A | 6/1977 | Berry et al. | |
| 4,048,342 A | 9/1977 | Haas et al. | |
| 4,053,704 A * | 10/1977 | Smith | H02G 15/06 174/138 F |
| 4,104,958 A * | 8/1978 | Manser | A23N 15/00 241/260.1 |
| 4,113,819 A | 9/1978 | Hayashi et al. | |
| 4,141,999 A | 2/1979 | Lolas | |
| 4,143,168 A | 3/1979 | Bernotaviez | |
| 4,196,222 A | 4/1980 | Cheney | |
| 4,207,154 A * | 6/1980 | Lemelson | B01J 3/08 204/157.41 |
| 4,212,894 A | 7/1980 | Cante et al. | |
| 4,215,153 A | 7/1980 | Kai et al. | |
| 4,233,320 A | 11/1980 | Monaco et al. | |
| 4,245,552 A * | 1/1981 | Small et al. | 99/483 |
| 4,247,562 A | 1/1981 | Bernotavicz et al. | |
| 4,266,920 A | 5/1981 | Hayashi et al. | |
| 4,301,719 A * | 11/1981 | Gerow | A23L 19/07 99/510 |
| 4,364,925 A | 12/1982 | Fisher | |
| 4,378,379 A | 3/1983 | Liesaus | |
| 4,446,161 A | 5/1984 | Friedman et al. | |
| 4,539,212 A | 9/1985 | Hunter | |
| 4,560,567 A | 12/1985 | Rausing | |
| 4,560,570 A * | 12/1985 | Rausing | B01F 5/0451 426/564 |
| 4,572,839 A | 2/1986 | Guitteny et al. | |
| 4,698,004 A | 10/1987 | Ramnarine | |
| 4,731,978 A | 3/1988 | Martensson | |
| 4,734,287 A | 3/1988 | Singer et al. | |
| 4,748,028 A | 5/1988 | McKenna et al. | |
| 4,781,939 A | 11/1988 | Martin et al. | |
| 4,784,862 A | 11/1988 | Wotherspoon | |
| 4,789,556 A | 12/1988 | Okonogi et al. | |
| 4,820,529 A | 4/1989 | Uchida et al. | |
| 4,851,243 A | 7/1989 | Andersen et al. | |
| 4,882,188 A | 11/1989 | Sawada et al. | |
| 4,888,192 A | 12/1989 | Ramnarine | |
| 4,954,061 A | 9/1990 | Repholz et al. | |
| 4,978,554 A | 12/1990 | Larsson et al. | |
| 5,132,137 A | 7/1992 | Reimann | |
| 5,209,156 A | 5/1993 | Lombard | |
| 5,219,530 A * | 6/1993 | Hertzberg | G10K 15/043 422/127 |
| 5,300,216 A * | 4/1994 | Hertzberg | G10K 15/043 208/130 |
| 5,334,407 A * | 8/1994 | Donnelly | A23L 7/198 426/618 |
| 5,374,437 A | 12/1994 | Lagares | |
| 5,431,939 A | 7/1995 | Cox et al. | |
| 5,456,933 A | 10/1995 | Lee | |
| 5,470,597 A | 11/1995 | Mendenhall | |
| 5,472,725 A | 12/1995 | Mendenhall | |
| 5,480,662 A | 1/1996 | Boode-Boissevain et al. | |
| 5,537,916 A | 7/1996 | Lagares-Corominas | |
| 5,544,961 A * | 8/1996 | Fuks | B01F 5/0405 137/3 |
| 5,566,895 A | 10/1996 | Otto et al. | |
| 5,567,466 A | 10/1996 | Dupont-Delhovren et al. | |
| 5,620,736 A * | 4/1997 | Reinl | A23L 1/0097 426/641 |
| 5,718,932 A | 2/1998 | Nakao et al. | |
| 5,792,498 A | 8/1998 | Palaniappan et al. | |
| 5,792,504 A | 8/1998 | Poppel | |
| 5,839,155 A * | 11/1998 | Berglund | A47L 7/04 15/321 |
| 5,843,501 A | 12/1998 | Rubin et al. | |
| 5,887,415 A | 3/1999 | Matthews et al. | |
| 5,888,131 A | 3/1999 | Kobussen et al. | |
| 5,925,394 A * | 7/1999 | Levinson | A23C 9/1565 426/241 |
| 5,928,705 A | 7/1999 | Matthews et al. | |
| 5,953,923 A * | 9/1999 | Davies | B67D 7/0255 222/4 |
| 5,958,487 A | 9/1999 | Emberger et al. | |
| 5,976,594 A * | 11/1999 | LaFollette | A23K 1/003 241/39 |
| 6,096,354 A | 8/2000 | Albrecht | |
| 6,379,738 B1 | 4/2002 | Dingman et al. | |
| 6,475,551 B2 | 11/2002 | Nozaki | |
| 6,543,339 B1 | 4/2003 | Albrecht | |
| 6,627,784 B2 | 9/2003 | Hudson et al. | |
| 6,672,334 B2 * | 1/2004 | Gill | F16K 7/075 137/601.03 |
| 6,770,318 B1 | 8/2004 | Roussell et al. | |
| 7,208,184 B2 | 4/2007 | Chen et al. | |
| 7,360,755 B2 | 4/2008 | Hudson et al. | |
| 7,637,207 B2 * | 12/2009 | Shidara | A01J 25/002 99/452 |
| 8,282,029 B2 | 10/2012 | Maaren et al. | |
| 8,778,438 B2 | 7/2014 | Leser et al. | |
| 8,840,835 B1 * | 9/2014 | Eidelman | A61L 2/02 204/157.15 |
| 2002/0084281 A1 * | 7/2002 | Horna | A21C 3/08 222/1 |
| 2003/0133354 A1 * | 7/2003 | Ledoux | A23L 2/54 366/174.1 |
| 2003/0194473 A1 * | 10/2003 | Redding, Jr. | A21D 2/36 426/238 |

(56) References Cited

U.S. PATENT DOCUMENTS

| | | | |
|---|---|---|---|
| 2005/0219938 A1* | 10/2005 | Rigaudon et al. | 366/3 |
| 2005/0249863 A1* | 11/2005 | Morin et al. | 426/646 |
| 2006/0062883 A1 | 3/2006 | Hanselmann et al. | |
| 2006/0126428 A1* | 6/2006 | Hudson | B01F 7/00816 366/101 |
| 2006/0147583 A1 | 7/2006 | Schlebusch et al. | |
| 2007/0122290 A1* | 5/2007 | Kamata | F04D 9/007 417/44.2 |
| 2007/0128335 A1* | 6/2007 | Iwamoto | A23C 11/103 426/634 |
| 2008/0171115 A1* | 7/2008 | Itoh | A23F 3/06 426/238 |
| 2009/0005552 A1* | 1/2009 | Hassan | B01F 7/00766 536/102 |
| 2009/0005588 A1* | 1/2009 | Hassan | B01F 7/00766 560/232 |
| 2009/0005622 A1* | 1/2009 | Hassan | B01F 7/00766 585/459 |
| 2009/0143253 A1* | 6/2009 | Smith | B01F 3/0446 507/102 |
| 2010/0004419 A1* | 1/2010 | Hassan | B01F 7/00766 526/351 |
| 2010/0104705 A1* | 4/2010 | Gordon | A23L 2/44 426/238 |
| 2010/0125157 A1* | 5/2010 | Hassan | B01F 3/0807 585/9 |
| 2010/0129514 A1* | 5/2010 | Cabrales | A22C 5/00 426/519 |
| 2010/0151099 A1 | 6/2010 | Kazemzadeh | |
| 2010/0199545 A1* | 8/2010 | Hassan | A23D 9/00 44/275 |
| 2011/0038992 A1* | 2/2011 | Arnold | C13B 10/12 426/238 |
| 2013/0216689 A1 | 8/2013 | Schlebusch | |
| 2014/0209507 A1* | 7/2014 | Hassan | F17D 1/00 208/88 |
| 2017/0232414 A1* | 8/2017 | Hassan | B01F 7/00766 422/187 |

FOREIGN PATENT DOCUMENTS

| | | | |
|---|---|---|---|
| EP | 857429 A1 * | 8/1998 | A23L 1/315 |
| EP | 0857429 A1 * | 8/1998 | A23L 1/0097 |
| EP | 1668992 | 6/2006 | |
| GB | 2116826 A | 10/1983 | |
| GB | 2141917 A * | 1/1985 | A23L 1/0088 |
| JP | S52154556 | 12/1977 | |
| JP | S5791153 | 6/1982 | |
| JP | 606177 | 1/1985 | |
| JP | S60118165 | 6/1985 | |
| JP | S62244372 | 10/1987 | |
| JP | 64010962 | 1/1989 | |
| JP | S642555 | 1/1989 | |
| JP | H01112968 | 5/1989 | |
| JP | 64002558 | 6/1989 | |
| JP | H01181777 | 7/1989 | |
| JP | H0257163 | 2/1990 | |
| JP | H02119774 | 5/1990 | |
| JP | 02219562 | 9/1990 | |
| JP | H02219562 | 9/1990 | |
| JP | H02286059 | 11/1990 | |
| JP | H0544264 | 7/1993 | |
| JP | H09207 | 1/1997 | |
| JP | H1132731 | 2/1999 | |
| JP | 2001204431 | 7/2001 | |
| JP | 2005269947 | 10/2005 | |
| WO | 9209213 | 6/1992 | |
| WO | 9702760 | 1/1997 | |

* cited by examiner

Section A-A

Section B-B

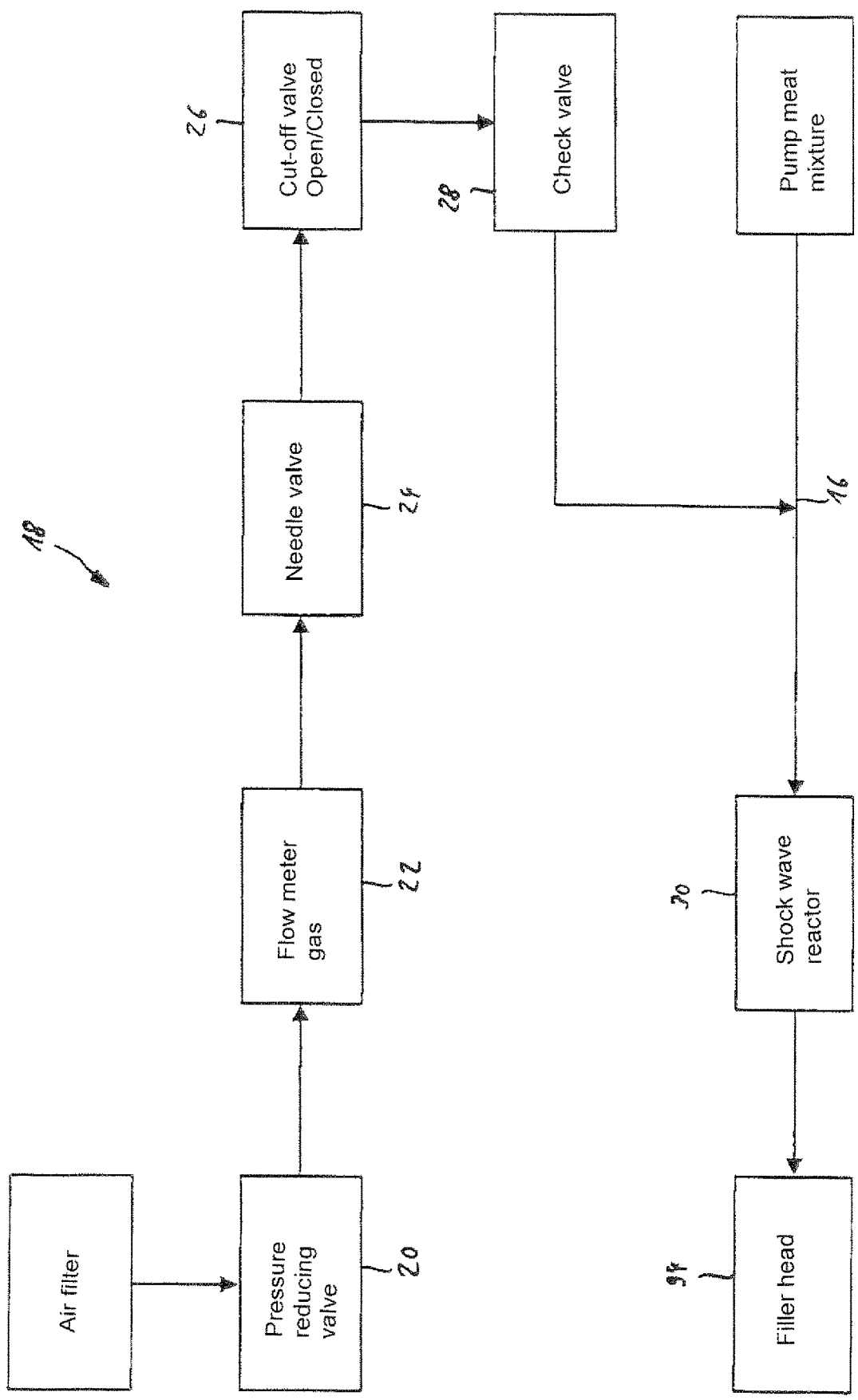

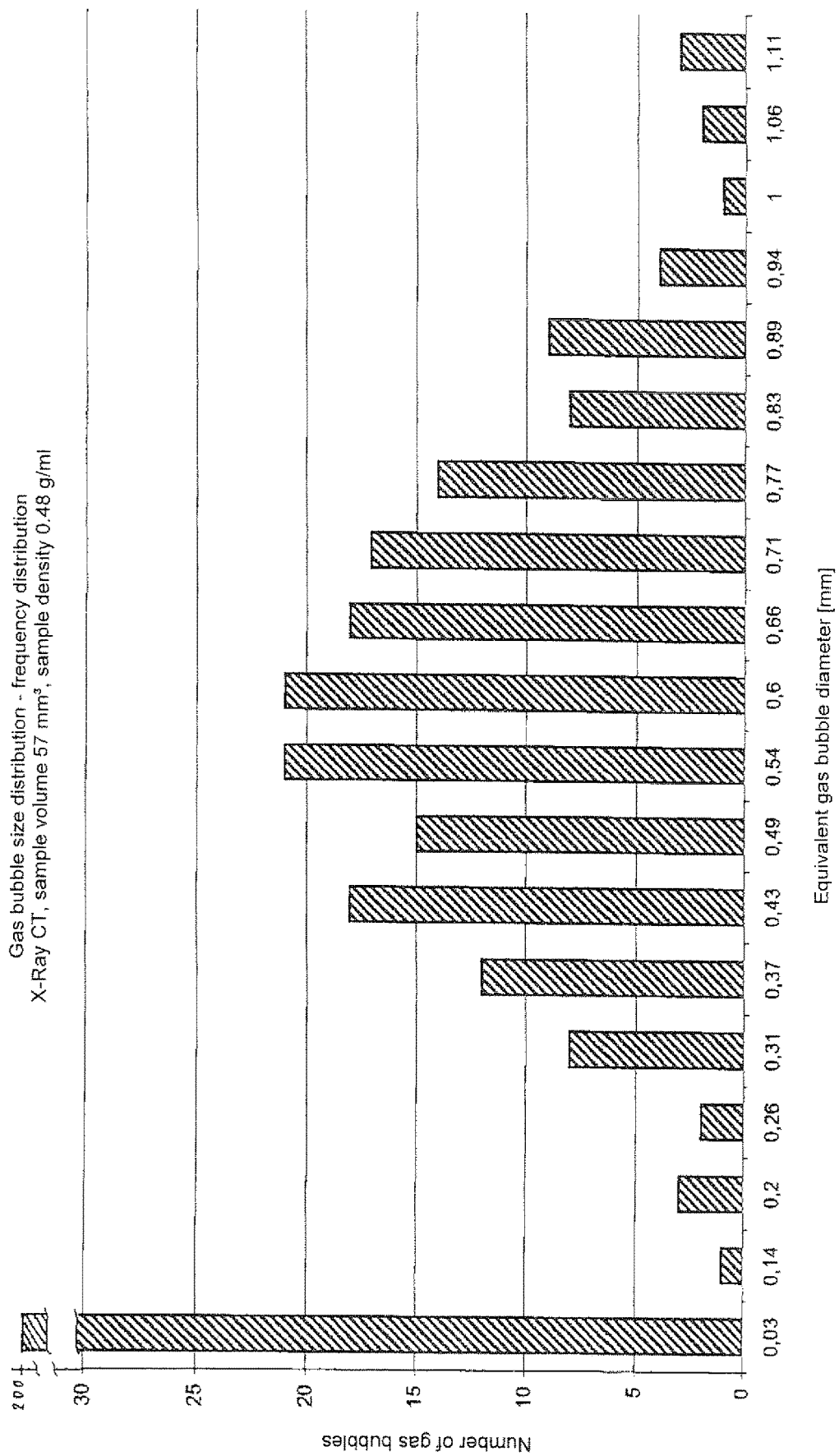

METHOD AND APPARATUS FOR PRODUCING A FOAMED MEAT OR FISH PRODUCT

The invention relates to a method and an apparatus for producing a foamed meat or fish product and to a foamed meat or fish product.

Compared to conventional, compact meat products, a foamed meat product offers a number of advantages, especially in the field of pet food. The light, smooth structure already gives the food a pleasant appearance. The increased volume and the reduced density of a foamed meat product also result in a reduction in the calorie density and the specific calorie content within a particular volume, as a result of which it is easier to maintain or reduce a given body weight. In addition, it results in a changed taste experience while eating, improved digestion and also, in the case of certain species, such as cats or dogs, which tend to a suboptimal liquid intake, it creates the possibility of improving the intake of liquid, together with the solid food.

Especially in the production of pet food products, the problem exists that it is on the one hand desirable also to use less expensive parts, such as animal by-products, as the raw material, while, on the other hand, some parts, such as in particular sinews, ligaments, twisted or coiled sheaths round connective tissue (epimysium, perimysium and/or endomysium) or similar strand-like, fibrous or filamentous collagen-containing parts of connective tissue, are very difficult to comminute and resist the comminution procedures conventionally used, which then leads to clogging and other difficulties in apparatuses of the kind conventionally used for foaming meat mixtures.

Meat and animal by-products contain not only the desirable muscle proteins (myofibrillary protein) and meat proteins (sarcoplasmatic protein), but also connective, structural and supporting tissue (stroma proteins). The most important connective tissue is collagen, together with elastin and reticulin, proteins from cell membranes and other proteins. The connective and supporting tissues comprise sinews, ligaments, fascia, skin and hide and are found in arteries, veins and separating tissues such as basal membranes (basal lamina) and also take the form of fibres and membranes which form a sheath round each individual muscle fibre (endomysium), bundles of muscle fibres (perimysium) and entire muscles (epimysium), fat cells or organs in animal tissue.

Because of the great strength and elasticity of this connective tissue—compared to the muscle tissue—, the connective tissue membranes round, in particular, sinews and ligaments (the latter mainly contain collagen of types I, III, IV, XII, XIX) are not chopped small enough during the comminution of meat or animal by-products, e.g. by cutters or mincers. Collagens, which can account for up to ⅓ of the entire body protein, are structural proteins of the skin, connective tissue and bones. As structural proteins, they determine the structure of the cell and thus ultimately the nature of the tissue and of the entire physique. After the meat and animal by-products have been comminuted in order to produce a fine meat mixture or meat emulsions, washing processes to extract the muscle tissue can reveal that these meat products contain long twisted connective tissue membranes, sinews and ligaments—which are as yet not heat-treated.

Even after the products have been comminuted by passing them through a 2 mm perforated disk or when they are emulsified through a 0.3 mm wide blade gap, it is still possible to find sinews, membranes and ligaments in the meat mixture with a total length of more than 40 mm.

During the production of meat emulsions, the muscle proteins are partially released from their matrix by the addition of salts, phosphates and other minerals. The connective tissue fibres and sinews etc. remain present in the meat mixture as coiled membranes and fibres. When this meat mixture is conveyed by positive-displacement pumps past measuring probes, mixer fingers, conventional static mixers or flow dividers installed transversely to the direction of flow, it is found that these fittings gradually become clogged by the longer fibrous sinews, twisted membranes and/or connective tissue fibres. If these fibrous parts from the meat mixture continue to collect on the fittings, it is even possible for entire pipes to become blocked.

The presence of sinews, ligaments or twisted and connective tissue membranes of this kind in meat emulsions produced on an industrial scale is probably also the reason why right down to the present day, no industrially homogeneously foamed meat products have become established on the market. This is the reason why in the patent literature (e.g. JP 2219562 A, U.S. Pat. No. 6,475,551 B2) on the foaming of meat products, either only silent cutters, bowl choppers or pressurised gassing are used, because these processes are not excessively disturbed by sinews, ligaments and membranes. The foam structure obtained with these processes is inhomogeneous, however, and is not stable. It is not possible to produce fine, stable foams from highly viscous liquid foams in this way.

The processes mentioned therefore only use meat with the sinews removed, or pure muscle tissue (lean meat). Formulations consisting of high-price materials of this kind and containing no sinews or long connective tissue fibres are then foamed using conventional rotor/stator systems (e.g. Hansa-Mixer, Mondo-Mix). The conventional foaming systems are therefore not suitable for foaming formulations containing fibres, since the fibres are deposited on and collect around the pins (fingers) of the rotors and around the pins (fingers) of the stators of the mixers, which then jam.

It is known from EP 1 289 638 B1 to disperse liquids with gases by deliberately causing cavitation.

The invention therefore set out to provide a method and an apparatus for producing a foamed meat product with which it is readily possible also to process raw materials containing the above-mentioned strand-like connective tissue components, such as sinews and similar strip-like or fibrous parts (e.g. ligaments, fibres, fascia, skins, hides).

From the point of view of the procedure, this problem is solved in accordance with the invention by a method of producing a foamed meat product, comprising the steps of: feeding a pumpable raw material containing comminuted meat and strand-like components of connective tissue, such as partially uncomminuted sinews and/or ligaments and/or connective tissue membranes, to a dispersing apparatus with a chamber with a cylindrical rotor positioned therein, which is provided, on its circumference, with a number of cavities to create cavitation, feeding a gas to the dispersing apparatus, operating the dispersing apparatus while creating cavitation and dispersing the gas fed in, in the process of which the sinews are passed through the chamber in particular without comminution, and creating a foamed meat product containing strand-like components of connective tissue, such as partially uncomminuted sinews and/or ligaments and/or connective tissue membranes.

So that meat containing foams remain stable for an adequate storage time, i.e. retaining their texture, the viscosity of the liquid phase must be as high as possible and the gas bubbles as small as possible. Separation processes resulting from the differences in density can be delayed in this way. For long-term stability, the liquid phase of the foam must be converted into a solid phase. In the present invention, this is achieved by a heating step or sterilisation, in which the protein of the meat, fish and slaughterhouse by-products are denatured and gelled. The conventional rotor/stator foaming processes are also only suitable to a limited extent for foaming highly viscous media, since high pumping pressures are required in order to overcome the small gaps resulting from the necessary high speeds with the maximum number of pins on the rotor and stator. Excessive heating of the product, combined with thermal damage to the protein, then leads to a reduced solidification of the protein in the foam during sterilisation and results in a less stable foam. Similarly, it is not possible to achieve stable foams with low densities of 0.4 to 0.6 g/ml with these processes.

A mixing and foaming apparatus known as the "Hansa-Mischer" uses rotor and stator members covered with pins, where rotor pins have a square 6×6 mm cross-section, for example 15 mm upstream and downstream of a pin in each case is the distance from the stator pins, for example. Low densities require high speeds with the maximum number of pins possible. With a wider pin spacing and low speeds, parts can be passed through, but in this way, with sufficiently high viscosities (necessary in order to stabilise the foam), it is not possible to obtain stable foams with small gas bubble sizes. The use, in accordance with the invention, of the cavitation rotor makes it possible to foam highly viscous fibrous formulations and to achieve small, homogeneously distributed gas bubbles.

The viscosities of the meat emulsions in accordance with the invention and the foams obtained are at least 5,000, 10,000, 15,000, 20,000, 25,000, 30,000, 35,000, 40,000, 45,000 or 50,000 cP at 20° C., and, by way of example, 10,000-40,000 cP, preferably 15,000 to 35,000 cP, especially 16,000 to 34,000 cP, most especially 20,000 cP to 34,000 cP. Measurements can be made with a Brookefield R+S rheometer with spindle 6 at 20 r.p.m. at a foam temperature of 20° C. and density of approx. 0.5 g/ml.

The strand-like components mentioned, such as sinews and/or ligaments and/or connective tissue membranes may have a minimum length in the raw material or in the foamed meat product of 3 mm, 5 mm, 10 mm, 15 mm, 20 mm, 25 mm or 30 mm, and they may be present in a proportion of at least 0.5% by weight, 1% by weight, 2% by weight, 5% by weight, 10% by weight or 20% by weight in the non-sterilised state, or in a proportion of at least 0.1% by weight, 0.2% by weight, 0.5% by weight, 1% by weight, 2% by weight or 5% by weight in the sterilised state, based in each case on the dry substance.

It may be provided that additives such as water, fat, oil, salt, emulsifiers, spices, gels, vegetable components, leaves or fibres, vegetables, cereals, starch, hydrocolloids, proteins, minerals, colorants and preservatives in comminuted or uncomminuted form are metered into the raw material, especially before its entry into the dispersing apparatus.

It is expedient, after starting or restarting the dispersing apparatus, for an amount of meat product corresponding to about one to 1.5 times the free content of the chamber of the dispersing apparatus to be returned to the starting material.

It is advantageous for the starting material to be lowered to a temperature of less than 30° C., preferably less than 25° C., 20° C., 17° C., 15° C., 12° C. or between 2° and 8° C., especially to 5° C. before it enters the dispersing apparatus.

It may be provided that the dispersing apparatus is operated in such a way that a density of the meat or fish product produced of 0.3 to 0.95 g/ml, preferably from 0.4 to 0.7 g/ml and particularly preferably from 0.45 to 0.6 g/ml is set.

It may be provided that the meat or fish product produced is fed to a metering apparatus and filled in containers after it exits the dispersing apparatus. One proposal in this context is that after the meat product produced exits the dispersing apparatus, i.e. while it is being fed from the dispersing apparatus to a metering apparatus, it is conveyed continuously at an overpressure and is thus exposed to an overpressure, which may lie in a range from 0.5 to 6.0 bar, preferably from 1.0 to 5.0 bar and more preferably from 2.0 to 4.0 bar.

The invention preferably provides that after it exits the dispersing apparatus, a first partial flow of the meat or fish product produced is mixed with an additive, such as a colorant, and is passed through a static mixing apparatus. After it exits the static mixing apparatus, the partial flow may be fed, together with a second flow of the meat or fish product produced, to a mixing head, so that partial strands of a stream of material produced with different compositions, such as different colours, can be formed.

It may be provided that as the gas, helium, hydrogen, nitrogen, air, oxygen, argon, $NH_3$, $N_2O$, $CO_2$ or any mixture of one or more of those gases is used.

It is preferably proposed that if there should be any interruption of the filling process, the meat product produced is circulated for a predetermined time from the output of the dispersing apparatus, through a cooling apparatus, to the inlet of the dispersing apparatus. In the process, it is in particular proposed that the meat product is cooled.

The foamed meat or fish product is preferably sterilised at a temperature between 110° C. and 130° C. for a period of between 10 and 50 minutes. In the sterilised product, an average gas bubble size of 0.1 to 7 mm, preferably from 0.15 to 5 mm, more preferably from 0.2 mm to 3 mm and even more preferably from 0.3 to 2 mm, such as 0.5 to 0.9 mm, is preferably produced.

It is appropriate for the density of the meat product produced to be determined continuously and for the amount of the gas to be supplied to be determined on this basis.

In terms of the apparatus, the problem underlying the invention is solved by an apparatus for producing a foamed meat or fish product, comprising a dispersing apparatus with a chamber with a cylindrical rotor positioned therein, which is provided on its circumference with a number of cavities to create cavitation, with a feeding pump coupled to an inlet of the dispersing apparatus, a gas delivery apparatus being disposed between the feeding pump and the inlet, and with a return line extending from an outlet of the dispersing apparatus to the inlet and with a cooling apparatus disposed in the course of the return line.

It may be provided that during operation of the metering apparatus, a buffer container is filled with foamed meat or fish product, the metering apparatus is no longer operated after a predetermined filling level of the buffer container is reached, foamed meat or fish product is removed from the buffer container to fill containers, and after a predetermined emptying level of the buffer container is reached, the metering apparatus is operated again, and the buffer container is again filled until the predetermined filling level is reached.

It may be provided that a metering apparatus for filling metered portions of the foamed meat products into containers is connected to the outlet of the dispersing apparatus.

A density measuring apparatus and/or a pressure measuring apparatus and/or a temperature measuring apparatus may be positioned downstream of the outlet from the dispersing apparatus, preferably between the outlet from the dispersing apparatus and a branch point at which the return line branches off.

A density measuring apparatus and/or a pressure measuring apparatus and/or a temperature measuring apparatus may be positioned upstream of the dispersing apparatus, preferably between the feeding pump and the inlet of the dispersing apparatus.

Between the outlet from the dispersing apparatus and the metering apparatus, two partial flow paths may be formed, a first partial flow path being connected to a first inlet of a mixing head, and a second partial flow path containing a feeder for additives, such as colorants, and a static mixing apparatus, and being connected to a second inlet of the mixing head.

The static mixing apparatus may possess a central canal or passage and mixing fingers pointing diagonally downwards into it.

The invention also relates to a foamed meat or fish product containing comminuted meat or fish and strand-like connective tissue components such as, in particular, sinews and/or ligaments and/or connective tissue membranes, it being possible for the strand-like connective tissue components to be partially uncomminuted. In the sterilised state (heated to 110° C. to 130° C. for 10 to 50 minutes), the meat product preferably contains an average gas bubble size of 0.1 to 7 mm, more preferably from 0.2 mm to 3 mm and even more preferably from 0.3 to 2 mm, and especially 0.4 to 0.9 mm. In this context, it is preferably envisaged that the meat product contains a weight ratio, based on dry matter, of strand-like connective tissue components with a length of more than 0.3 mm of 0.10% to 20% by weight, especially 0.11% to 10%, 0.12% to 5% or 0.13% to 3%, which can be determined by washing out over a 0.3 mm mesh sieve.

It may be provided that the meat product contains uncomminuted pieces of meat with a size of 3 to 20 mm.

In addition, the meat product may contain additives such as water, fat, oil, salt, emulsifiers, spices, gels, vegetable components, leaves or fibres, vegetables, cereals, starch, hydrocolloids, proteins, minerals, colorants and preservatives in comminuted or uncomminuted form.

The invention will now be explained by describing worked embodiments, reference being made to a drawing, in which FIG. 1 shows a worked embodiment of an apparatus in accordance with the invention.

Figure 3B:
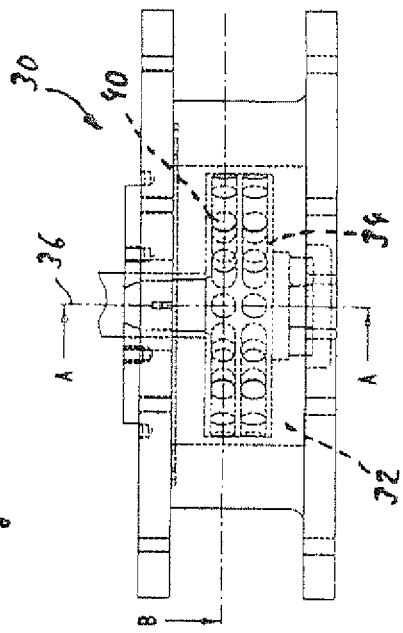
FIG. 3a shows a section view of a second variant of a dispersing apparatus.
Figure 3D:
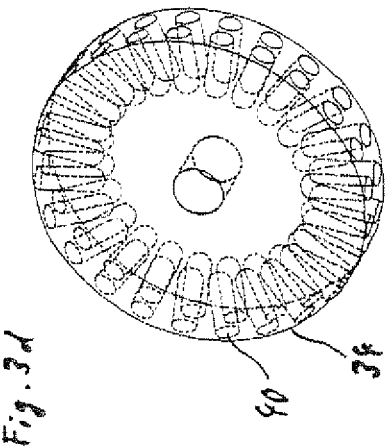
Figure 3A:
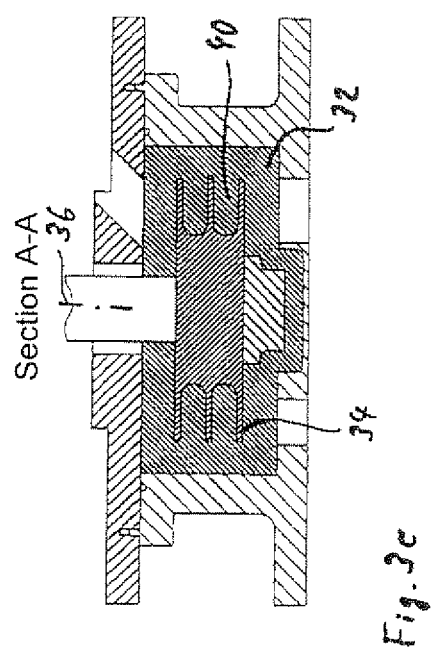
Figure 3C:
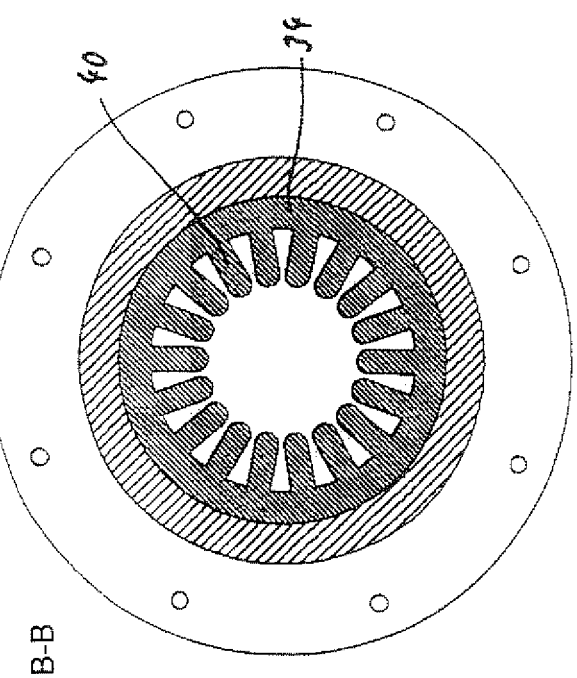
Figure 5A:
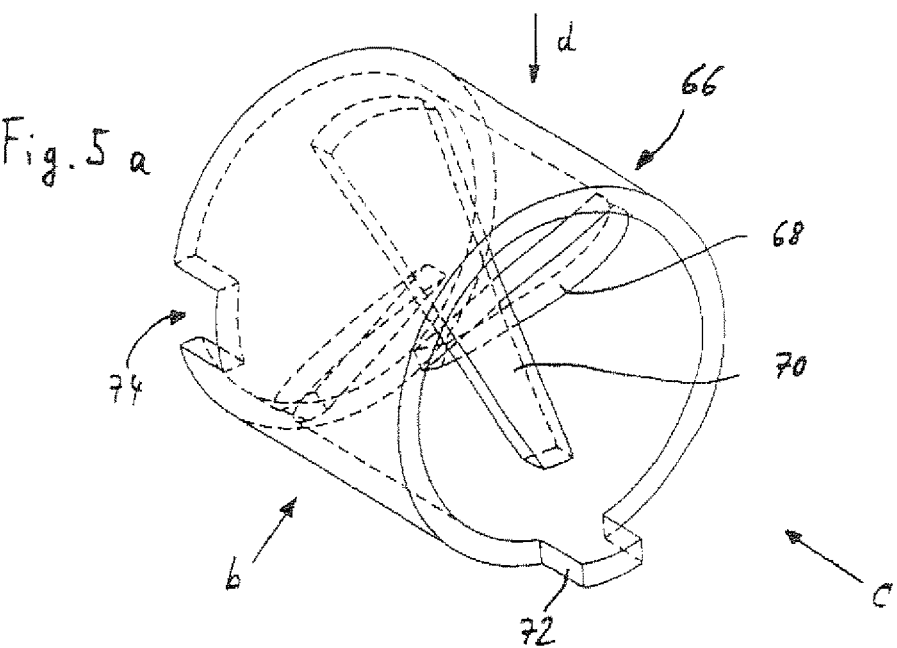
Figure 5B:
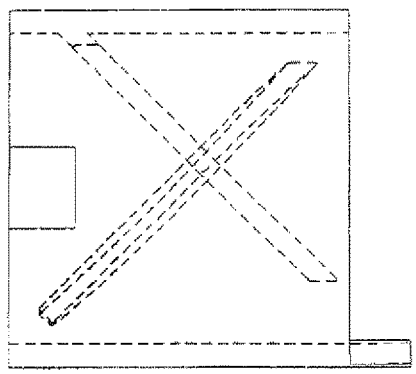
Figure 5C:
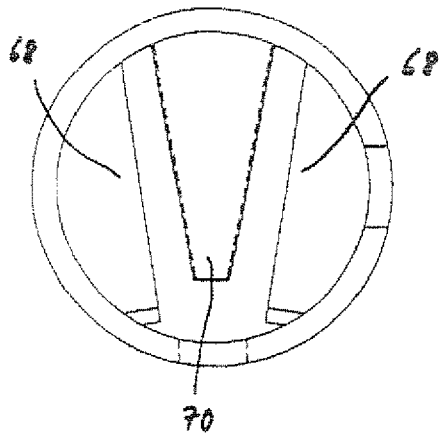
Figure 5D:
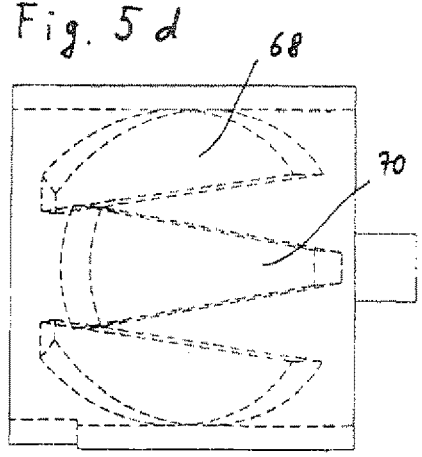
Figure 6:
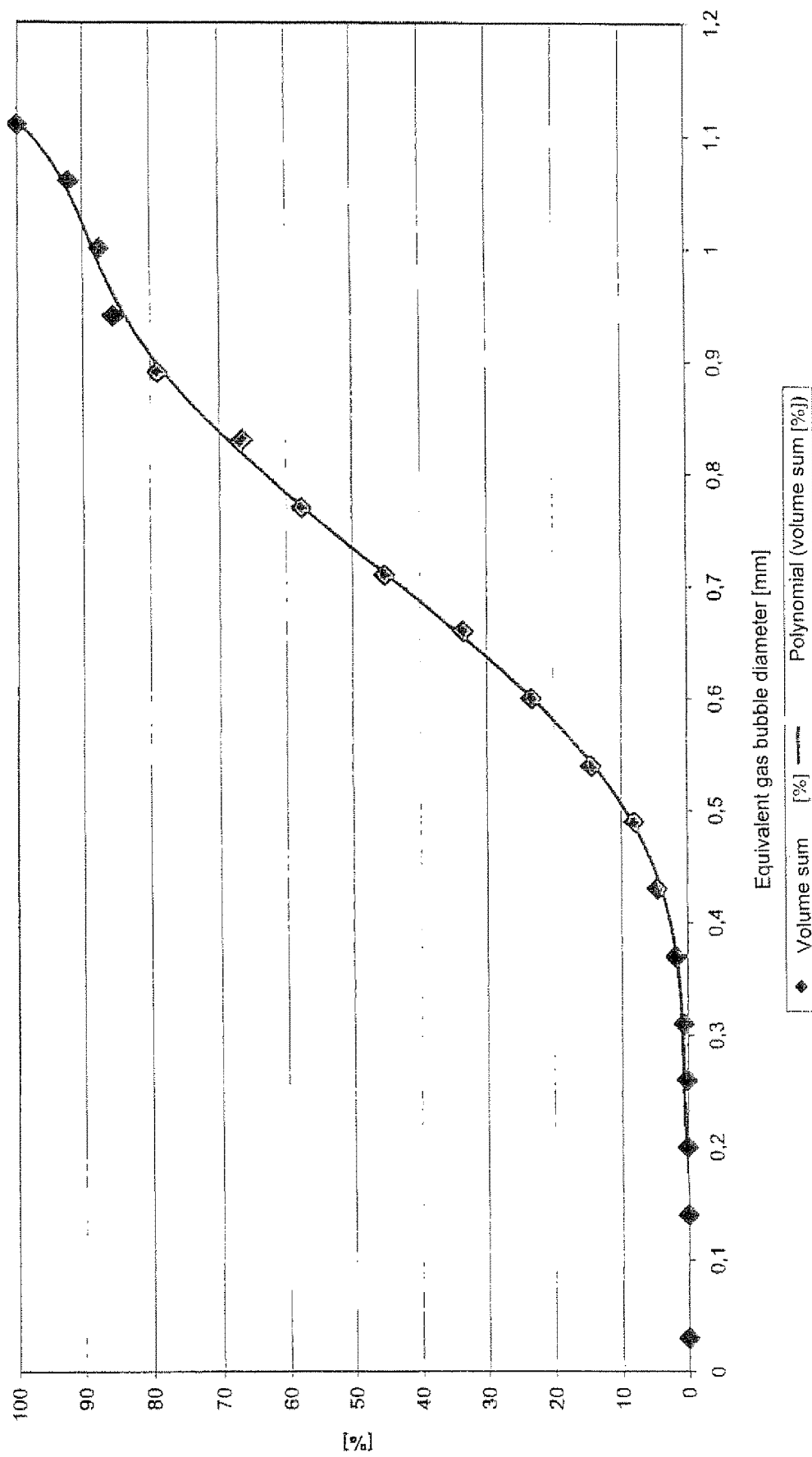

FIG. 3b shows a schematic view of the second variant of the dispersing apparatus, FIG. 3c shows a view of the dispersing apparatus according to FIG. 3b in cross-section, FIG. 3d shows a perspective view of a rotor of the dispersing apparatus according to FIG. 3b, FIG. 4 shows details of the supply of gas to the dispersing apparatus, FIGS. 5 a-d show a static mixing element in a number of views, FIG. 6 shows a cumulative frequency distribution of the gas bubble sizes in the foamed, sterilised meat product, and FIG. 7 shows a detailed gas bubble size distribution.

Figure 1:
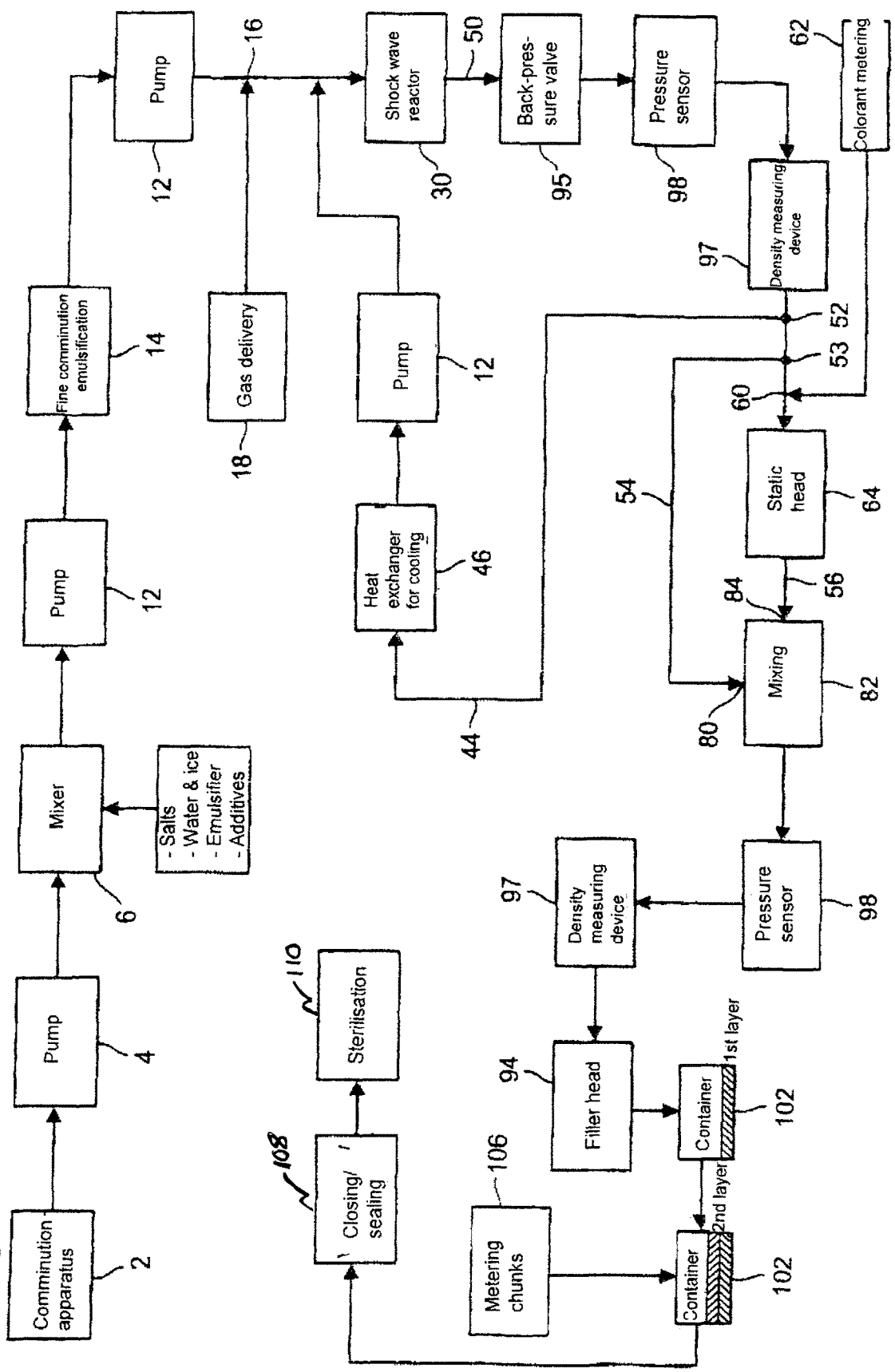

The method and apparatus of the invention will be explained below with reference to the exemplary illustration of an apparatus for producing a meat product in accordance with FIG. 1 which contains gas bubbles or is foamed.

Meat (and/or fish) to be processed in accordance with the invention is fed in a cooled or frozen state to a comminution apparatus 2, in which it is chopped to a size that makes it possible to process the foamed product. Comminution to a size of less than 3 mm, preferably less than 1 mm, less than 0.5 mm or less than 0.1 mm is appropriate. In the process, meat fibres and any bones present can be comminuted to the dimensions stated. Since, however, sinews, ligaments, twisted connective tissue membranes and similar elements are very difficult to comminute, because of their structure and strength, they may remain with little comminution or uncomminuted in the otherwise comminuted meat.

It may be provided in this context that, in addition to the amount of strand-like connective tissue components, such as sinews and/or ligaments, which is present in any case in the meat or fish to be processed, an additional amount may be added as well, which may come, for example, from the processing of meat into products in which a content of connective tissue components such as sinews or ligaments is undesirable and from which the latter are removed.

A sample formulation for the production of a foamed meat product will now be explained. A portion of meat and animal by-products (especially poultry liver, poultry gizzards, poultry separator meat, pigs' stomachs, pigs' lungs) amounts to approx. 45 to 55% by weight, especially 52% by weight. Water is added in a proportion of approx. 30 to 40% by weight, especially 36% by weight. Emulsifiers and salts are also added.

A first pump 4 conveys the comminuted meat to a mixer 6, in which additives are metered in as required and depending on the formulation and mixed with the meat. Examples of such additives are water, fat, oil, salt, ice, emulsifiers, spices, gels, vegetable components, leaves, fibres, vegetables, cereals, starch, hydrocolloids, proteins, minerals, colorants and preservatives in comminuted or uncomminuted form.

A second pump 12 conveys the meat preparation further to a fine comminution apparatus 14, which forms an emulsifying station at the same time.

After the mixture exits the emulsifier 14 and, where applicable, a further pump 12, a gas with which the meat preparation is to be foamed is supplied at a gas inlet 16. In principle, any gas suitable for use with foodstuffs may be used for this purpose, such as helium, hydrogen, nitrogen, oxygen, argon, $NH_3$, $N_2O$, $CO_2$, air etc., though those gases are particularly suitable which are both inert, i.e. oxygen-free in particular, and which exhibit the lowest possible solubility in water, or in the meat preparation to be foamed. Nitrogen exhibits considerably lower solubility than $CO_2$ and is therefore preferable as a matter of principle.

A gas-supply unit, here for example a pressure-swing adsorption unit 18 (FIG. 4), supplies pressurised nitrogen via an air filter, a pressure reducing valve 20, a flow meter 22, a needle valve 24, a cut-off valve 26 and a check valve 28 to the gas inlet 16, where the gas enters the comminuted and emulsified meat preparation in metered form.

The gas/meat mixture is delivered to a dispersing apparatus 30 in the form of a shock wave reactor, in which the gas is dispersed into small gas bubbles. The structure and action of the dispersing apparatus 30 are explained by FIGS. 2 and 3.

Figure 2:
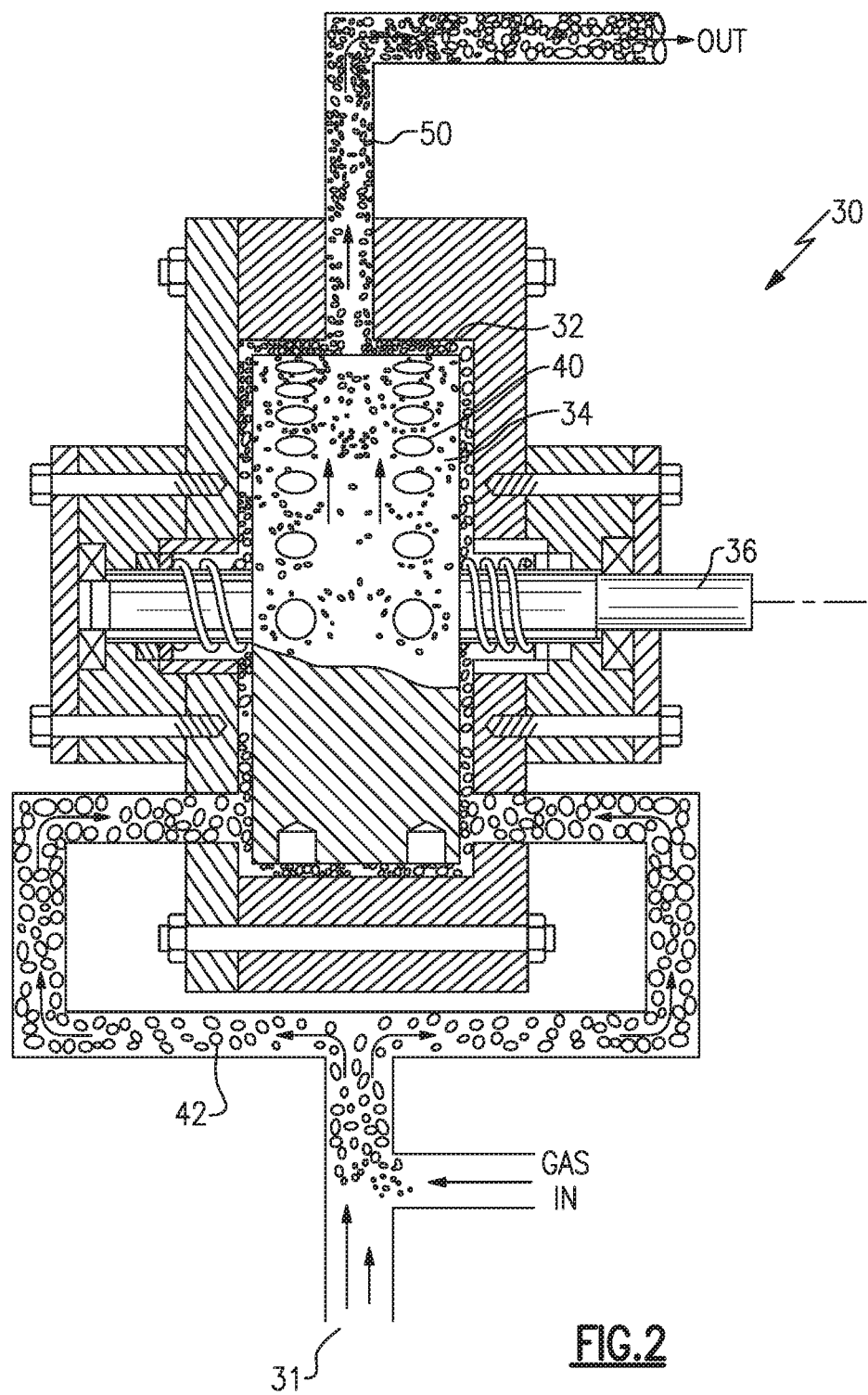
FIG. 2 shows a section view of a first variant of a dispersing apparatus.

FIG. 2 shows a first embodiment of the dispersing apparatus 30 (shock wave reactor) and FIG. 3 a second embodiment in various views, which consists substantially of a cylindrical chamber 32 closed on all sides, in which a rotor 34 is mounted such as to be rotatable about an axis of rotation 36. The rotor 34 is likewise cylindrical and is spaced apart on all sides from the peripheral and end walls of the chamber 32, so that the space formed in this way (free chamber volume) is filled with the gas/meat mixture to be processed.

Arranged on the periphery of the rotor 34 are a number of radially aligned bore holes 40, which lead in a manner known per se to the formation of shock waves and cavitation bubbles, which collapse and lead in this way to a fine dispersion of the gas supplied. The dispersion process is indicated in FIG. 2 in that the gas supplied is present in relatively large bubbles 42, whereas the product exiting contains finely dispersed gas bubbles, which are merely hinted at in FIG. 2.

The cavitation bubbles formed collapse principally in the interior of the bore holes 40 and lead to extremely great shear forces and pressure waves, which result not only in a particularly fine dispersion of the gas supplied, but also in a relatively uniform size distribution, or in a limited scatter in the size distribution of the gas bubbles formed.

When the dispersing apparatus 30 is started or restarted, the desired product quality is not obtained immediately, but experience has rather shown that about 1 to 2 times, preferably 1.5 times the free chamber volume must be passed through the dispersing apparatus before a steady operating state is reached. In order to avoid having to reject as waste the material produced during such a starting-up period which does not meet the requirements, a return line 44 and optionally a further pump 12 is provided, with which the material can be circulated via the dispersing apparatus 30. A cooling apparatus 46 ensures that the heat introduced into the product by the dispersing apparatus 30 is dissipated, because the gas bubble content means that heating of the product is undesirable, and also that emulsified fats remain largely solid. A temperature of less than 30° C., preferably less than 25° C., 20° C., 17° C., 15° C., 12° C. or between 2° C. and 8° C., and especially 5° C. is appropriate. During the recirculation of the product, neither gas nor meat preparation is supplied.

Material exiting the dispersing apparatus 30 can be recirculated not only in the course of a startup process, but also, if the need arises, in the event of a delay in the filling area, so that the dispersing apparatus does not need to be switched off in such cases. In particular, it is appropriate to cool the recirculated material with the cooling apparatus 46 in such a case.

In addition, it is possible to arrange a buffer container in any convenient location downstream of the dispersing apparatus 30, such as after the mixing head 82 or immediately before the filler head 94, which makes it possible to receive a certain amount of the foamed meat or fish product, such as 10, 20, 50 or 100 times a amount envisaged for filling a container, so that a corresponding number of containers can be filled from the buffer container. Since the throughput of the dispersing apparatus cannot as a rule be adjusted exactly to the flow of material which is filled through the filler head 94 averaged out over time, it is possible to have the dispersing apparatus 30 running in cycles until the buffer container is filled, then to switch it off and only to switch it back on when the buffer container has been emptied to a set residual level, such as 5% or 10% of its capacity.

Two branches 52, 53 are arranged downstream of an outlet 50 from the dispersing apparatus 30, the first branch 52 leading to the cooling apparatus 46, and a first partial flow path 54 and a second partial flow path 56 following on from the second branch 53. The first partial flow path 54 can be closed with a cut-off valve.

First of all, an inlet 60 for additives is provided in the second partial flow path 56, to which a colorant metering pump 62 is connected in the example illustrated. Alternatively, any other additive could be introduced at this point, e.g. vegetables or cereal paste, gels, aspic, gravy, dairy products, hydrocolloids, starch, proteins, minerals, colorants and preservatives, and/or a meat or fish emulsion or a suspension containing pieces of meat or fish can be dispersed in.

After the inlet 60 comes a static mixing unit 64, in which a series of static mixing members 66 are arranged. FIG. 5 shows a static mixing member 66 in different views, the mixing member consisting substantially of a length of cylindrical pipe with mixing surfaces 68 arranged radially and axially and pointing inwards, and with a mixing finger 70 arranged between them.

When the throughput is sufficient, a good mixing effect results, so that the additive previously introduced is mixed with the foamed meat product. When the throughput is low, a dispersing effect is caused. Because of the arrangement of the inclined mixing surfaces pointing down-stream and the mixing fingers, fibre-like components of the foamed meat product and especially the sinews, ligaments etc. contained in it, can move through the mixing members with no difficulty and do not become trapped. Preferably, a number of mixing members 66 are arranged in series, especially aligned at 90° to one another, as is made clear by positioning projections 72 and corresponding positioning recesses 74 arranged at 90° thereto, which are disposed on the respective axial ends of a mixing member and with which two adjacent mixing members can be coupled in a positive fit.

The first partial flow path 54 is connected to a first inlet 80 of a mixing head 82, while the second partial flow path 56 is connected to a second inlet 84 of the mixing head 82.

In operation, it can be provided that that 50% to 95%, such as 85%, of the material exiting the dispersing apparatus 30 flows through the first partial flow path 54, while the remaining amount flows through the second partial flow path 56 and the static mixing unit 64.

A filler head 94 serving as a metering apparatus follows the mixing head 82. In this context, it is proposed that the material exiting the dispersing apparatus 30 is introduced into the filler head 94 via a back-pressure valve 95 and a static mixing unit 64. The arrangement of a back-pressure valve has the advantage that upstream, i.e. in the dispersing apparatus 30, a particular minimum pressure can be maintained, e.g. at least 1.5 bar or a pressure between 2 and 2.5 bar. At least one pressure sensor 98 and a density measuring device 97 are provided in order to ensure that as far as the filler head 94 an overpressure of approx. 0.5 to 6 bar, preferably 1 to 4 bar and more preferably 1.5 to 3 bar prevails within the material conveyed. The reason why this is important is that, because of the gas content, the foamed material must as far as possible not be exposed to a partial vacuum in certain cases, in order not to impair the gas bubble structure.

Alternatively, a conventional filling apparatus can be installed downstream of the mixing head, with an intake and dispensing station, at which material coming from the mixing head is optionally drawn in metered amounts and dispensed in metered amounts.

Beneath the filler head there are scales, with which the filling of a particular container 102 is monitored and the filling procedure is terminated. Downstream of the filler head, there is a metering apparatus 106 for lumpy additives. After that, closing, sealing 108 and sterilization 110 devices are positioned.

After part of the available filling volume of the container 102, e.g. 70% to 90% of it, has been filled with the foamed meat product, the rest of the available filling volume, or part of it, can be filled with lumpy additives such as vegetables, fruit, cereals, pieces of meat, slaughterhouse by-products, meat analogues, pieces of fish, fish analogues, surimi, pieces of egg, pieces of fruit, nuts or pieces of nut.

The invention is suitable for implementing various product concepts, such as a) meat or fish foam with nothing added, b) meat foam with vegetables and/or cereals added, c) meat foam with vegetable or cereal pastes introduced in a marbled pattern, the density of which is approx. 1 g/ml, d) meat foam with pieces of meat mixed in, slaughterhouse by-products and/or meat analogues (chunks), e) meat foam with pieces of meat and/or meat analogues in layers at the top or bottom, f) meat foam with a layer of gel/aspic at the top or bottom, which may also contain pieces of meat, meat analogues, pieces of vegetable or cereals, g) meat foam with pieces of meat, pieces of vegetable or meat analogues in layers at the top or bottom, which are present in a gravy, h) meat foam containing pieces of egg mixed in or in layers at the top or bottom, possibly in gravy or in gel/aspic, i) meat foam containing individual foods mixed in or in layers at the top or bottom, possibly in gravy or in gel/aspic (individual foods: meat or animal by-products, milk and dairy products, eggs and egg products, oils and fats, yeasts, fish and fish by-products, cereals, vegetables, vegetable by-products, vegetable protein extracts, minerals, sugar, fruits, nuts, seeds, algae, molluscs and crustaceans, insects, bakery products).

One method of detecting connective tissue in fresh meat has been further developed on the basis of Strange and Whiting (Strange E. D., Whiting, R. C., "Effects of added connective tissues on the sensory and mechanical properties of restructured beef steaks", Meat Science 27, (1990) pp. 61-74) for detecting connective tissue even in heat-treated, foamed fish/meat products:

Materials:
1. Stainless-steel analytical sieve (0.300 mm), Retsch
2. 2,000 g 15% $H_3PO_4$ solution (20° C., pH 1; 1.5 M $H_3PO_4$)
3. 1,000 g 5% NaOH solution (20° C., pH 12.2; 1.25 M NaOH)
4. Aqua dest. (20° C.) for rinsing solid samples on the analytical sieve
5. Mixer "3MIX 7,000", Krups, mixing member: egg-beater
6. Colloid mill MK/MKO, IKA magic LAB, IKA GmbH & Co. KG, speed=12,000 r.p.m., 450° setting angle (1¼ turns on the setting ring: radial gap=0.398 mm
7. Laboratory analytical balance, Sartorius
8. Drying cabinet T 6030, Heraeus Thermo Scientific
9. Desiccator Method:
1. Determine the dry mass (DM in %) of the sample (at 104° C. until constant weight is reached)
2. Comminute/stir approx. 50-55 g sample (weigh in precisely P) with 100 ml water for 30 s with a hand mixer on level 1 with egg-beaters.
3. Comminute the suspension through the IKA colloid mill: —IKA MK/MKO (radial gap 0.398 mm=>1¼ turns); rinse the colloid mill with water.
4. Separate solids via a stainless-steel sieve with a mesh width of 0.30 mm.
5. Leave solids/residue for 5 hours in 500 ml NaOH solution (stir occasionally)
6. Separate solids again with a stainless-steel sieve with a mesh width of 0.30 mm. Rinse off caustic soda remaining on the sieve with water
7. Steep the sieve with the residue in the phosphoric acid for 60 seconds
8. Rinse the sieve with water
9. Dry the sieve at 104° C. until constant weight is reached
10. Weigh the dry mass retained (R) on the 0.30 mm sieve
11. Express the results:
    proportion of fibrous connective tissue [>0.30 mm; %]=((R)×100)/((DM in %)×(P))

Amounts of connective tissue found in this way in foamed products before and after sterilisation:

TABLE 1

| Foamed meat/fish product | Dried fibrous and solid connective tissue determined by washing out over 0.3 mm sieve (shown in % by weight of the dry mass of the foamed meat/fish product investigated) | | | | Recovery rate of fibrous and solid connective tissue, after sterilisation [%] after sterilisation Average [%] |
|---|---|---|---|---|---|
| | before sterilisation | | after sterilisation | | |
| | Average [%] | 95% confidence interval +/− [%] | Average [%] | 95% confidence interval +/− [%] | |
| with trout | 10.56 | 2.65 | 1.13 | 0.29 | 10.71 |
| with salmon | 6.75 | 0.42 | 0.89 | 0.36 | 13.20 |
| with beef | 6.70 | 0.83 | 1.18 | 0.27 | 17.67 |
| with chicken | 7.19 | 1.15 | 0.73 | 0.14 | 10.13 |

After sterilisation, lower figures are regularly found for the remaining strand-like connective tissue components, because the majority of the collagen from the membranes etc. is degraded to water-soluble gelatine during the sterilisation process. Sinews are detected very well with the method.

TABLE 2

| | Dried fibrous and solid connective tissue determined by washing out over 0.3 mm sieve (shown in % by weight of the dry mass of the raw material used) | | | | Recovery rate of fibrous and solid connective tissue, after sterilisation [%] after sterilisation Average [%] |
|---|---|---|---|---|---|
| | before sterilisation | | after sterilisation | | |
| | Average [%] | 95% confidence interval +/− [%] | Average [%] | 95% confidence interval +/− [%] | |
| Chicken liver | 0.137 | 0.054 | 0.017 | 0.012 | 12.42 |
| Pig's lung | 8.504 | 0.604 | 1.177 | 0.651 | 13.84 |

TABLE 2-continued

| | Dried fibrous and solid connective tissue determined by washing out over 0.3 mm sieve (shown in % by weight of the dry mass of the raw material used) | | | | Recovery rate of fibrous and solid connective tissue, after sterilisation [%] after sterilisation Average [%] |
|---|---|---|---|---|---|
| | before sterilisation | | after sterilisation | | |
| | Average [%] | 95% confidence interval +/− [%] | Average [%] | 95% confidence interval +/− [%] | |
| Deboned turkey meat | 2.516 | 0.247 | 0.100 | 0.025 | 3.96 |
| Pig's stomachs | 7.081 | 2.822 | 0.678 | 0.349 | 9.57 |
| Cattle lung | 12.075 | 1.918 | 2.492 | 1.148 | 20.64 |
| Chicken gizzards | 7.321 | 1.761 | 0.913 | 0.341 | 12.47 |
| Trout cut-offs | 3.626 | 0.328 | 0.381 | 0.136 | 10.51 |
| Salmon cut-offs | 4.740 | 0.344 | 0.388 | 0.117 | 8.19 |
| Duck meat | 0.953 | 0.160 | 0.090 | 0.013 | 9.42 |

Table 2 shows the amounts and recovery rates of strand-like connective tissue components for different types of meat.

The high proportion of larger connective tissue (larger than 0.30 mm) before foaming makes it clear how necessary it is to use a method that can process high viscosities irrespective of the fibres or pieces and which ensures a fine gas distribution.

FIGS. 6 and 7 show a cumulative frequency distribution and a detailed gas bubble size distribution.

The diameters of the gas bubbles of equal volume $d_{3.2}$ in the sterilised foam range from approx. 20-2,000 μm diameter. The mean was approx. 0.73 mm diameter.

The Reynolds numbers when mixing or dispersing other pumpable components into the foam were found to lie in the range $0.0010 < Re < 0.0150$.
Pumpable component (vegetable paste): $0.0023 < Re < 0.0051$.
Average Re number at the mixing point: $0.0140 < Re < 0.3,000$.

The fluctuations are due to the formation of the average speeds: In one case, the average was formed over the mass, and in the second calculation it was formed over the flow surfaces.

Formulation Information:

Example 1: Foamed Meat/Fish Product (Batch Size 80 kg)

| | |
|---|---|
| Vitamin/mineral/nutrition mix: | 1.80% |
| Emulsifiers (individually or a combination of substances in accordance with the list of emulsifiers for animal feed from "Community Register of Feed Additives pursuant to Regulation (EC) No 1831/2003, Appendices 3 & 4, Annex: List of additives (status: Released 21 May 2010.)" | 1.00% |
| Vegetable fibre powder (SBP, cellulose) | 3.00% |
| Hydrocolloid | 0.20% (e.g. CMC carboxy-methyl-cellulose or individual or a combination of substances from the list of additives for animal feed from "Community Register of Feed Additives pursuant to Regulation (EC) No 1831/2003, Appendices 3 & 4, Annex: List of additives (status: Released 21 May 2010.)" |
| Pigs' blood plasma powder | 2.00% |
| Turkey separator meat | 5.00% |
| Chicken gizzards | 6.00% |
| Pig's stomachs | 12.00% |
| Chicken liver | 14.00% |
| Pigs' lungs | 15.00% |
| Water | 40.00% |

Process Information:

All the meat is frozen (−18° C.) and comminuted to approx. 20×20 mm.

In a Paddle Mixer:
1st step: mix meat with minerals for 3 minutes.
2nd step: add half the water (30° C.) and mix for a further 2 minutes.
3rd step: add remaining dry ingredients, rotate for 1 minute in each direction.
4th step: add emulsifier and remaining water.
Before emptying, mix for approx. one minute to drain.
Total mixing time approx. 10 min.

The meat mixture is now at a temperature of approx. +2° C. and is emulsified in an emulsifying apparatus through a combination of blades and 1.5 mm perforated disks. The mixture is now at a temperature of approx. 5° C.

The mixture is then conveyed at a mass flow of 2.2 kg/min, with the addition of 2.2 l nitrogen or comressed air through a shock wave reactor (ex HydroDynamics, Rome, Ga., US). The speed of the rotor is 1,800 r.p.m. The rotor has a diameter of 304.8 mm and a width of 50.75 mm. 2 parallel rows of holes, each with 30 holes, are arranged on the circumference. The individual holes have a diameter of 18.8 mm and a depth of 50 mm. The volume of a hole is 13.5 ml. The distance between the circumference of the rotor and the fixed housing is ¼"=6.4 mm.

The temperature of the foam obtained in this way is: 32.0° C. At this temperature, the foam can be filled directly, controlled by gravimetry, volumetry or pressure.

After the foam has been filled in a suitable container (tin, bowl, pouch), and the latter has been sealed and sterilised thermally (T>110° C.), a stable product is obtained (fully preserved), which can be stored at room temperature for at least 2 years. The stable foam product is characterised by a homogeneous distribution of the gas bubbles, a moist, shiny, solid foam texture and a high level of acceptance by pets.

Example 2: Foamed Meat Product With Fish (Batch Size 80 kg)

| | |
|---|---|
| Vitamin/mineral/nutrition mix: | 2.00% |
| Emulsifiers (individually or a combination of substances in accordance with the list of emulsifiers for animal feed from "Community Register of Feed Additives pursuant to Regulation (EC) No 1831/2003, Appendices 3 & 4, Annex: List of additives (status: Released 21 May 2010.)" | 1.00% |
| Vegetable fibre powder (SBP, cellulose) | 1.30% |
| Hydrocolloid | 0.20% (as in Example 1) |
| Pigs' blood plasma powder | 1.50% |
| Turkey separator meat | 5.00% |
| Chicken gizzards | 6.00% |
| Pig's stomachs | 12.00% |
| Chicken liver | 13.00% |
| Pigs' lungs | 13.00% |
| Salmon by-products | 7.00% |
| Water | 38.00% |

Process Information:

All the meat and fish materials are frozen (−18° C.) and comminuted to approx. 20×20 mm.

In a Paddle Mixer:

1st step: mix meat with minerals for 3 minutes.

2nd step: add half the water (30° C.) and mix for a further 2 minutes.

3rd step: add remaining dry ingredients, rotate for 1 minute in each direction.

4th step: add emulsifier and remaining water.

Before emptying, mix for approx. one minute to drain. Total mixing time approx. 10 min.

The mixture of meat and fish is now at a temperature of approx. +2° C. and is emulsified in an emulsifying apparatus through a combination of blades and 1.5 mm perforated disks. The mixture is now at a temperature of approx. 5° C.

The mixture is then conveyed at a mass flow of 2.0 kg/min, with the addition of 2.0 l nitrogen or comressed air through a shock wave reactor (ex HydroDynamics, Rome, Ga., US). The speed of the rotor is 2,200 r.p.m. The rotor has a diameter of 266 mm and a width of 50.75 mm. 2 parallel rows of holes, each with 24 holes, are arranged on the circumference. The individual holes have a diameter of 18.8 mm and a depth of 50 mm. The volume of a hole is 13.5 ml. The distance between the circumference of the rotor and the fixed housing is ¼"=6.4 mm.

The temperature of the foam obtained in this way is 31.0° C. At this temperature, the foam can be filled directly, controlled by gravimetry, volumetry or pressure.

After the foam has been filled in a suitable container (tin, bowl, pouch), and the latter has been sealed and sterilised thermally (T>110° C.), a stable product is obtained (fully preserved), which can be stored at room temperature for at least 2 years. The stable foam product is characterised by a homogeneous distribution of the gas bubbles, a moist, shiny, stable foam texture and a high level of acceptance by pets.

Example 3: Foamed Meat Product With Fish (Batch Size 80 kg)

| | |
|---|---|
| Vitamin/mineral/nutrition mix: | 2.70% |
| Emulsifiers (individually or a combination of substances in accordance with the list of emulsifiers for animal feed from "Community Register of Feed Additives pursuant to Regulation (EC) No 1831/2003, Appendices 3 & 4, Annex: List of additives (status: Released 21 May 2010.)" | 1.00% |
| Vegetable fibre powder (SBP, cellulose) | 3.00% |
| Hydrocolloid | 0.30% (as in Example 1) |
| Pigs' blood plasma powder | 2.00% |
| Turkey separator meat | 4.00% |
| Chicken gizzards | 6.00% |
| Pig's stomachs | 11.00% |
| Chicken liver | 13.00% |
| Pigs' lungs | 12.00% |
| Trout by-products | 6.00% |
| Water | 39.00% |

Process Information:

All the meat and fish materials are frozen (−18° C.) and comminuted to approx. 20×20 mm.

In a Paddle Mixer:

1st step: mix meat with minerals for 3 minutes.

2nd step: add half the water (30° C.) and mix for a further 2 minutes.

3rd step: add remaining dry ingredients, rotate for 1 minute in each direction.

4th step: add emulsifier and remaining water.

Before emptying, mix for approx. one minute to drain. Total mixing time approx. 10 min.

The mixture of meat and fish is now at a temperature of approx. +2° C. and is emulsified in an emulsifying apparatus through a combination of blades and 1.5 mm perforated disks. The mixture is now at a temperature of approx. 5° C.

The mixture is then conveyed at a mass flow of 2.0 kg/min, with the addition of 2.0 l nitrogen or comressed air through a shock wave reactor (ex HydroDynamics, Rome, Ga., US). The speed of the rotor is 1,500 r.p.m. The rotor has a diameter of 203 mm and a width of 50.75 mm. 2 parallel rows of holes, each with 18 holes, are arranged on the circumference. The individual holes have a diameter of 18.8 mm and a depth of 50 mm. The volume of a hole is 13.5 ml. The distance between the circumference of the rotor and the fixed housing is 1"=25.4 mm.

The temperature of the foam obtained in this way is 21.0° C. At this temperature, the foam can be filled directly, controlled by gravimetry, volumetry or pressure.

After the foam has been filled in a suitable container (tin, bowl, pouch), and the latter has been sealed and sterilised thermally (T>110° C.), a stable product is obtained (fully preserved), which can be stored at room temperature for at least 2 years. The stable foam product is characterised by a homogeneous distribution of the gas bubbles, a moist, shiny, stable foam texture and a high level of acceptance by pets.

It is possible to use the following permitted additives: Emulsifiers for Animal Feed from: "Community Register of Feed Additives Pursuant to Regulation (EC) No 1831/2003, Appendices 3 & 4, Annex: List of Additives (Status: Released 21 May 2010.)"

| EC No. | Additives: Emulsifiers |
|---|---|
| E 322 | Lecithins |
| E 432 | Polyoxyethylene(20) sorbitan monolaurate |
| E 433 | Polyoxyethylene(20) sorbitan mono-oleate |
| E 434 | Polyoxyethylene(20) sorbitan monopalmitate |
| E 435 | Polyoxyethylene(20) sorbitan monostearate |
| E 436 | Polyoxyethylene(20) sorbitan tristearate |
| E 471 | Mono and diglycerides of edible fatty acids |
| E 472 | Mono and diglycerides of edible fatty acids esterified with:<br>a) acetic acid<br>b) lactic acid<br>c) citric acid<br>d) tartaric acid<br>e) monoacetyl and diacetyl tartaric acid |
| E 473 | Sugar esters (esters of saccharose and edible fatty acids) |
| E 474 | Sugar glycerides (mixture of saccharose esters and mono and diglycerides of edible fatty acids) |
| E 475 | Polyglycerine esters of edible fatty acids |
| E 477 | Monoesters of proylene glycol (1.2-propane diol) of edible fatty acids, alone or mixed with diesters |
| E 480 | Stearyl-2-lactylic acid |
| E 481 | Sodium stearyl lactyl-2-lactate |
| E 482 | Calcium stearyl lactyl-2-lactate |
| E 483 | Stearyl tartrate |
| E 484 | Polyethylene glycol glyceryl ricinoleate |
| E 487 | Polyethylene glycol soybean oil fatty acid ester |
| E 488 | Polyethylene glycol glyceryl tallow fatty acid ester |
| E 489 | Polyglycerine ether with the alcohols obtained by reduction of oleic acid and palmitic acid |
| E 491 | Sorbitan monostearate |
| E 492 | Sorbitan tristearate |
| E 493 | Sorbitan monolaurate |
| E 494 | Sorbitan mono-oleate |
| E 495 | Sorbitan monopalmitate |
| E 496 | Polyethylene glycol 6,000 |
| E 497 | Polymers of polyoxypropylene-polyoxyethylene (M.G. 6,800-9,000) |
| E 498 | Partial polyglycerine esters of polycondensed ricinoleic fatty acids |

Thickening and Gelling Agents for Animal Feed from: "Community Register of Feed Additives Pursuant to Regulation (EC) No 1831/2003, Appendices 3 & 4, Annex: List of Additives (Status: Released 21 May 2010.)"

| EC No. | Additives: |
|---|---|
| E 400 | Alginic acid |
| E 401 | Sodium alginate |
| E 402 | Potassium alginate |
| E 403 | Ammonium alginate |
| E 404 | Calcium alginate |
| E 405 | Propylene glycol alginate (1.2-propane diol alginate) |
| E 406 | Agar-agar |
| E 407 | Carrageenan |
| E 410 | Carob seed flour |
| E 411 | Tamarind seed flour |
| E 412 | Guar seed flour, guar gum |
| E 413 | Gum tragacanth |
| E 414 | Gum arabic |
| E 415 | Xanthan gum |
| E 418 | Gellan gum |
| E 440 | Pectins |
| E 460 | Microcrystalline cellulose |
| E 460(ii) | Cellulose powder |
| E 461 | Methyl cellulose |
| E 462 | Ethyl cellulose |
| E 463 | Hydroxypropyl cellulose |
| E 464 | Hydroxypropyl methyl cellulose |
| E 465 | Methyl ethyl cellulose |
| E 466 | Carboxymethyl cellulose (sodium salt of the cellulose carboxymethyl ether) |
| E 470 | Sodium, potassium or calcium salts of the edible fatty acids, alone or mixed, obtained either from edible fats or from distilled edible fatty acids |

| EC No. | Additives: |
|---|---|
| E 486 | Dextrans |
| E 498 | Partial polyglycerine esters of polycondensed ricinoleic fatty acids |
| E 499 | Cassia gum |

LIST OF REFERENCE NUMERALS

2 Comminution apparatus
4 First pump
6 Mixer
8 Second pump
12 Third pump
16 Gas inlet
18 Pressure-swing adsorption unit
20 Pressure controller
22 Flow meter
24 Needle valve
26 Cut-off valve
28 Check valve
30 Dispersing apparatus
31 Inlet for Dispersing apparatus
32 Chamber
34 Rotor
36 Axis of rotation
40 Bore hole
42 Gas bubble
44 Return line
46 Cooling apparatus
50 Outlet
52 Branch
54 First partial flow path
56 Second partial flow path
60 Inlet
62 Colorant metering pump
64 Static mixing unit
66 Static mixing member
68 Mixing surface
70 Mixing fingers
72 Positioning projection
74 Positioning recess
80 First inlet
82 Mixing head
84 Second inlet
94 Filler head
95 Back-pressure valve
97 Density measuring device
98 Pressure sensor
102 Container
106 Metering apparatus
108 Closing/sealing device
110 Sterilizing device

The invention claimed is:

1. A system for producing a foamed meat or fish product, said system comprising:
a shock wave reactor that accepts a gas and meat mixture and produces the foamed meat or fish product; and
a back pressure valve for providing an overpressure to components of the system upstream of the back pressure valve, further comprising at least a first comminution apparatus operably disposed upstream of the shock wave reactor that receives a source of meat and/or fish and provides a comminuted meat/fish preparation.

2. The system of claim 1, further comprising a gas supply unit operably disposed relative to the at least a first comminution apparatus to provide gas to the comminuted meat/fish preparation.

3. The system of claim 2, further comprising a second comminution apparatus, at least one mixer, a return line operably disposed relative to the shock wave reactor, at least one cooling apparatus, or a combination of these.

* * * * *